United States Patent [19]
Zankowski

[11] Patent Number: 6,014,858
[45] Date of Patent: Jan. 18, 2000

[54] APPARATUS AND METHOD FOR REDUCING HARMFUL PRODUCTS OF COMBUSTION

[76] Inventor: Arthur Zankowski, 113 Ward Ave., Oxford, N.C.

[21] Appl. No.: 08/914,423

[22] Filed: Aug. 19, 1997

[51] Int. Cl.⁷ ........................................................ F01N 3/00
[52] U.S. Cl. ................................ 60/274; 60/283; 60/281; 60/324; 123/522; 123/590
[58] Field of Search .............. 60/274, 278, 288, 60/292, 324, 283, 281; 239/102.2; 204/157.62; 123/522, 534, 568.15, 593, 590

[56] References Cited

U.S. PATENT DOCUMENTS

| | | | |
|---|---|---|---|
| 3,800,533 | 4/1974 | Zankowski . | |
| 4,029,064 | 6/1977 | Csaszar et al. | 123/119 |
| 4,401,089 | 8/1983 | Csaszar et al. | 123/536 |
| 4,742,810 | 5/1988 | Anders et al. | 123/538 |
| 5,002,033 | 3/1991 | Housand | 123/522 |

Primary Examiner—Thomas Denion
Assistant Examiner—Binh Tran
Attorney, Agent, or Firm—Rosenthal & Putterman

[57] ABSTRACT

A method and apparatus for reducing the harmful products of combustion comprises an enclosed vessel adapted to contain a quantity of volatile liquid fuel and a means for extracting gaseous vapors from the fuel and for mixing the vapors with the combustion supporting gas for combustion in an internal combustion engine. A thermal reactor is included into which the combustion exhaust gases from the internal combustion engine are discharged. A flow limiting valve is interposed in the path of the exhaust gases from the thermal reactor for discharging a first portion of the exhaust gases to the atmosphere and returning a second portion of the exhaust gases to the thermal reactor vessel. Also provided is a valve for discharging the second portion of the exhaust gases from the internal combustion engine at a temperature below the boiling range of the liquid fuel into the vessel below the surface of the liquid fuel therein and an ultrasonic generator for imparting ultrasonic energy to the exhaust gases.

25 Claims, 4 Drawing Sheets

6,014,858

APPARATUS AND METHOD FOR REDUCING HARMFUL PRODUCTS OF COMBUSTION

FIELD OF THE INVENTION

This invention relates generally to the field of combustion engines and other combustion-based apparatus wherein a fossil fuel is burned and environmentally polluting exhaust gasses are generated and more particularly to a method and apparatus for converting these gases to non-polluting gases.

BACKGROUND OF THE INVENTION

Hydrocarbon fuels are among the most common thermal energy conversion means in use today. Of particular significance is the use of various petroleum products, notably commercial grade gasoline, as virtually the only acceptable fuel for internal combustion engines. The exhaust gases emitted from gasoline engines (the vast majority of which is generated by motor vehicles) are comprised of carbon dioxide, carbon monoxide, oxides of nitrogen, unburned hydrocarbons, water vapor and particulate matter. Of these, only carbon monoxide, oxides of nitrogen and unburned hydrocarbons have been strictly regulated as pollutants. In recent years carbon dioxide has been found to be a major contributor to global climate change (also referred to as global warming or the greenhouse effect) and international agreements have been implemented in an effort to reduce carbon dioxide. To date, only nominal progress has been made in reducing the pollution gasses generated by combustion engines. A system which significantly reduces the pollution gasses generated as the result of combustion would therefore be of great commercial value and of great value to society as a whole if such a system could be devised.

It is therefore an object of the present invention to provide an improved system for reducing, in significant quantity, environment polluting gasses and particulates generated as the result of combustion.

Another object of the present invention is to provide an improved system for reducing polluting gasses and particulates generated as the result of combustion which is reliable.

Yet another object of the present invention is to provide an improved system for reducing polluting gasses and particulates generated as the result of combustion which is inexpensive.

A still further object of the present invention is to provide an improved system for reducing polluting gasses and particulates generated as the result of combustion which is easy to install as a retro-fit to existing motor vehicle and in new motor vehicles.

A still further object of the present invention is to provide an improved system for reducing polluting gases and particulates generated as the result of combustion which reduces exhaust mass flow.

SUMMARY OF THE INVENTION

In accordance with the present invention, there is provided a method and apparatus for reducing the harmful products of combustion. The system comprises an enclosed vessel adapted to contain a quantity of volatile liquid fuel and a means for extracting gaseous vapors from the fuel and mixing the vapors with the combustion supporting gas for combustion in an internal combustion engine. A thermal reactor is included into which a portion of the combustion exhaust gases from the internal combustion engine are discharged. A flow limiting means is interposed in the path of the exhaust gases from the thermal reactor for discharging a first portion of the exhaust gases to the atmosphere and returning a second portion of the exhaust gases to the thermal reactor vessel. Also provided is a means for discharging the second portion of the exhaust gases from the internal combustion engine at a temperature below the boiling range of the liquid fuel into the vessel below the surface of the liquid fuel therein and an ultrasonic generator for imparting ultrasonic energy to the exhaust gases.

BRIEF DESCRIPTION OF THE DRAWINGS

Some of the objects of the invention having been stated, other objects will appear as the description proceeds when taken in connection with the accompanying drawings in which.

DETAILED DESCRIPTION OF THE PREFERRED EMBODIMENT

While the present invention will be described more fully hereinafter, it is to be understood at the outset that persons of skill in the art may modify the invention herein described while still achieving the favorable results of this invention.

In the specification which follows the invention is described in the context of a conventional internal combustion engine. Notwithstanding the foregoing, it will be readily apparent to those skilled in the art that the principals embodied in the invention may readily be employed in a wide variety of applications. Also, the primary engine fuel is assumed to be a liquid hydrocarbon fuel, such as a low octane grade gasoline, but other volatile liquid fuels are also suitable and, may also be employed with equal efficacy.

Figure 1:
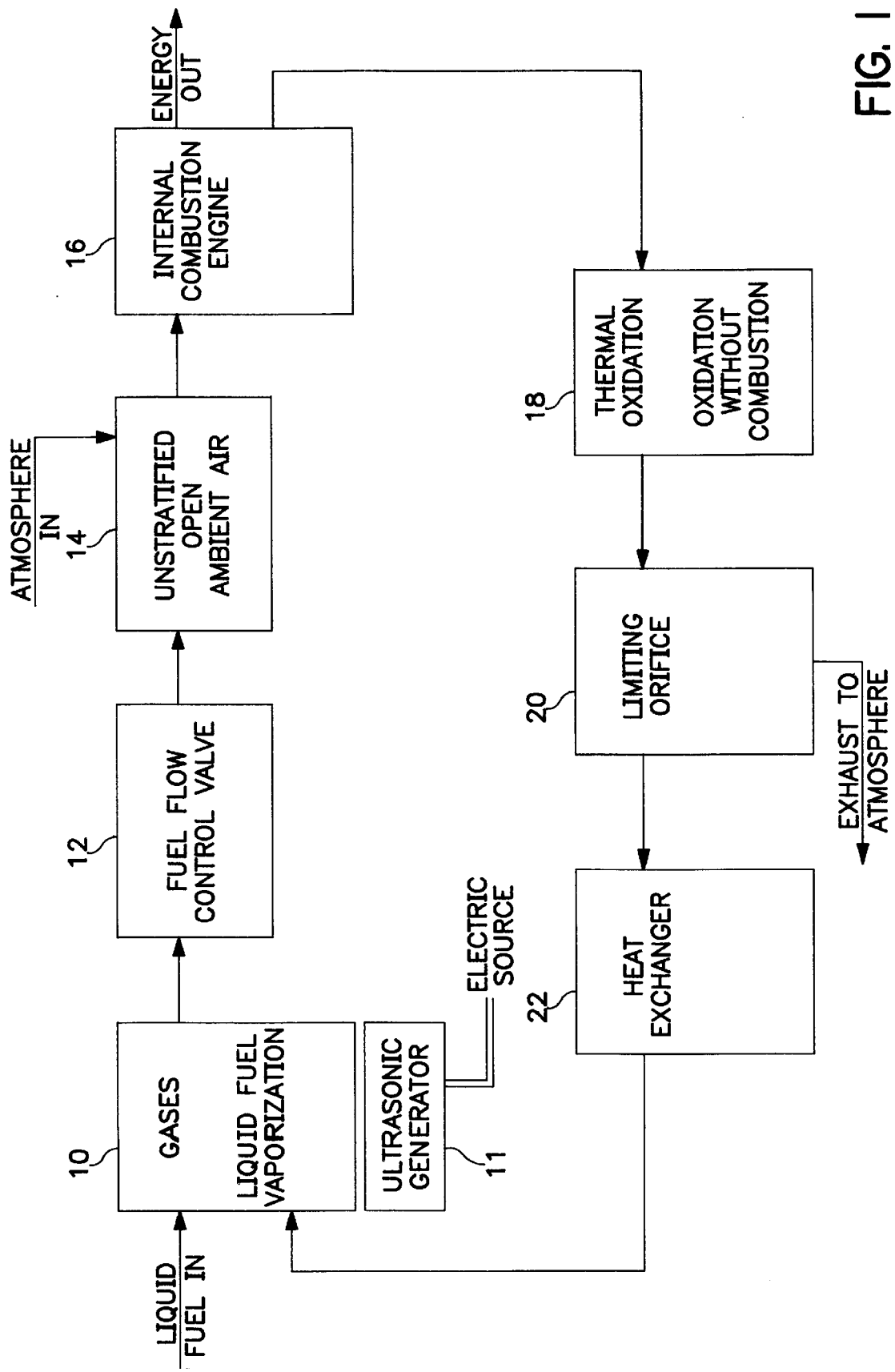
FIG. 1 is a block diagram of the invention incorporated into conventional combustion engine and associated exhaust system.
Figure 1A:
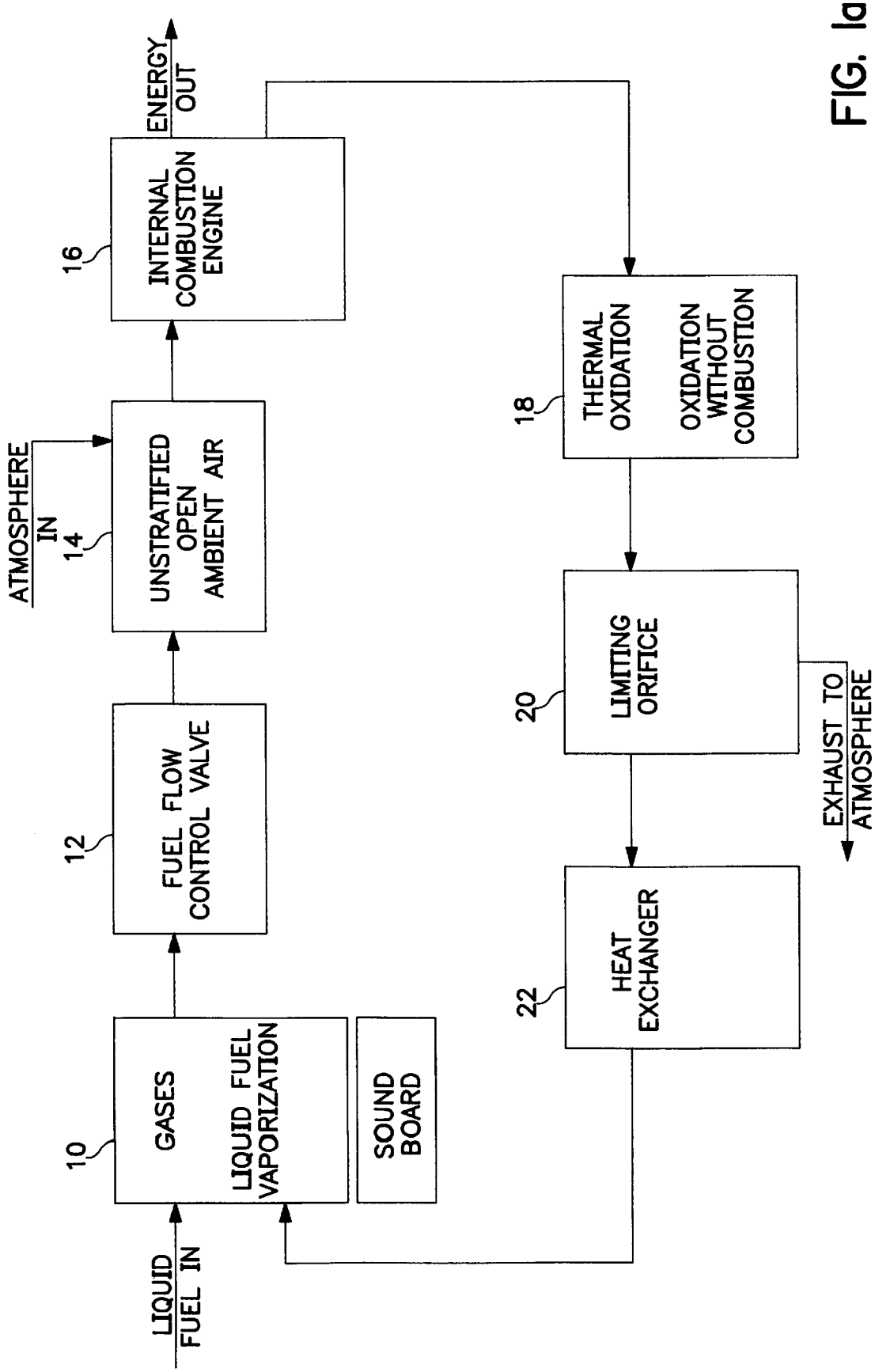

Referring now to the figures and particularly to FIG. 1, the liquid fuel supplied from a storage tank, reservoir, or other appropriate source is vaporized in a reaction vessel 10. The fuel may be vaporized by conventional methods, such as by applying heat and/or pressure. Relatively low temperatures or pressure differential are normally sufficient to produce vaporization at the necessary rate, as discussed hereinbelow. Vaporization may be effected or aided by returning to the vaporizing unit a portion of the exhaust gases from the engine, after the latter has begun running to produce such gases.

The fuel is then passed through a one way check valve and a fuel control valve 12, which controls the fuel flow rate to the combustion engine. The valve 12 is a conventional valve, well known to those skilled in the art.

In the process of being vaporized the fuel is mixed with a diluent carrier gas, all or part of which may be provided by the returned or recycled exhaust gases. Thereafter, the fuel vapor-carrier gas mixture will also be mixed with air at air intake 14 to support combustion of the fuel. In a combustion system according to the prior art, an apparatus for regulating the fuel-air mixture (i.e., a carburetor or fuel-injector) would be inserted prior to the fuel entering the internal combustion engine. However, in accordance with the present invention, a fuel-air mixture controlling device is not required as much of the oxygen required to support combustion (with the possible exception of engine start up) is provided by breaking down the exhaust gases, as will be more fully explained hereinbelow.

An ultrasonic generator means or ultrasonic generator 11 is operatively associated with a reaction vessel 10. The ultrasonic generator 11 may take the form of a conventional ultrasonic generator which is constructed and arranged to impart ultrasonic vibrational energy to the products of combustion, and particularly to the products of combustion within the reaction vessel 10. In the test model that was constructed, the ultrasonic generator was a sound board which connected the combustion engine 16 with the reaction vessel 10. The sound board acts as a conductor for the ultrasonic vibrational energy generated by the engine which were measured to be 23 KHz. It is contemplated that in production models, the ultrasonic generator will be an electronic device that will receive its power from the electrical system of the combustion engine. It is believed that the ultrasonic energy is transferred to the exhaust gas bubbles within the reaction vessel, causing them to oscillate which, in turn, causes a certain percentage of the exhaust gases to disassociate, thereby making hydrogen and oxygen as well as other compounds available for combustion. As employed herein, ultrasonic energy is defined as vibrational energy above 16 KHz.

The gaseous fuel charge (vaporized fuel and hydrogen/oxygen molecules) is then burned to produce useable energy in what may be broadly termed a thermal energy converter, indicated by block 16. This may take a number of forms, including virtually all known apparatus for effecting combustion of a fuel of the character described with a contained exhaust. That is, the products of combustion are not immediately released to the atmosphere, but instead are contained within an enclosed system wherein further processing of the combustion products may be performed. One common form of thermal energy converter wherein the invention is employed is an ordinary internal combustion engine, either reciprocating or rotary piston. For purposes of the present disclosure, as previously mentioned, it is assumed that thermal energy conversion takes place in an internal combustion engine conventional in all respects from intake to exhaust.

The products of combustion, after leaving the thermal energy converter, are oxidized without further combustion, as indicated by block 18. Thermal oxidation, converting carbon monoxide in the exhaust to carbon dioxide, takes place by containing the exhaust gas for a sufficient period of time to allow the heat of the exhaust gases coupled with the presence of oxygen to effect such oxidation. It is important to note, however, that thermal oxidation does not take place by "afterburning" the combustion products. Although afterburners may be effective in reducing concentrations of carbon monoxide, they increase the equally or more harmful oxides of nitrogen. The oxidation without combustion contemplated by the present invention takes place at low enough temperature that oxides of nitrogen in significant quantities are not formed.

After undergoing thermal oxidation, the exhaust gases are diverted into two paths. As indicated by block 20, a first portion is released to the atmosphere and a second portion is returned to the process to serve as the carrier gas for the fuel vapor. A limiting orifice is placed in the path of the gas to be released to the atmosphere and the returned portion is diverted through an other line back to the fuel vaporization unit. The structure and arrangement of the limiting orifice and flow diverting means, discussed later in more detail, is preferably such that relatively high proportions of the exhaust gases, e.g., within the range of 50 to 75 percent by volume, are returned to the process after being thermally oxidized.

The portion of the exhaust gas which is retained in the system must be at a temperature below the boiling range of the fuel before being mixed therewith. The gas is cooled either by expansion, or by separate heat exchanger means, or a combination thereof, before being returned to the fuel source. Block 22 indicates any necessary heat exchange which takes place between the division of the exhaust gases into released and recycled portions and the mixing of the recycled portion with the vapors from the liquid fuel.

Figure 2:
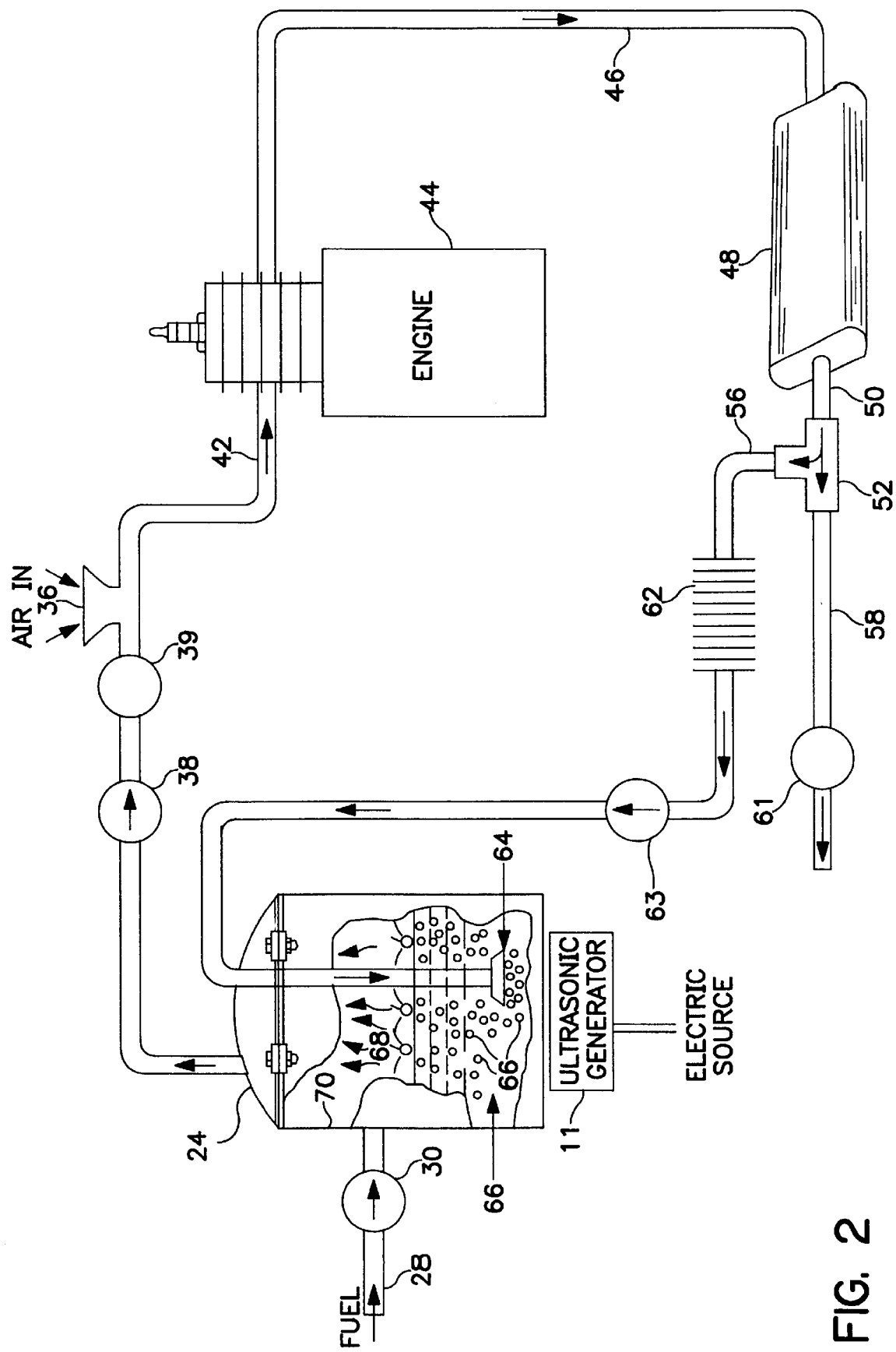
FIG. 2 is a schematic diagram of the apparatus according to the present invention.

Turning now to FIG. 2, there is shown an embodiment of apparatus incorporating the invention. The apparatus of FIG. 2, is more of a laboratory than a commercial nature, since the practical applications of the invention are widely varied, Enclosed vessel 24 holds a quantity of volatile liquid fuel 26, e.g., commercial grade gasoline. Fuel line 28 extends into vessel 24 from a gasoline tank or other supply source (not shown) for continually replenishing the liquid fuel in a conventional fashion. Also positioned in line 28 is a check valve 30 which maintains pressure in vessel 24. Fuel 26 is converted from liquid to vaporized form and leaves vessel 24 through line 34. Flow is initiated by creating a temperature pressure combination within vessel 24 which results in vaporization of at least the more volatile fractions of the particular fuel being used. In many cases, it is sufficient to initiate operation that the fuel be provided at ambient temperature and a pressure differential created within vessel 24 by turning over the engine, for example, with an electric starter. After initial operation, vaporization is aided by returning a portion of the exhaust gases to vessel 24, explained in more detail hereinbelow.

Line 34 carries the fuel vapors from vessel 24 to air intake 36 where the vapors are mixed with combustion-supporting air. Valve 39 in line 34 is provided to regulate flow of fuel vapors from vessel 24 to air intake 36, by controlling pressure differential. One-way check valve 38 is provided to permit flow in only one direction. Line 42 leads directly to the intake manifold of engine 44, an internal combustion engine of conventional design. Since the fuel is in a fully vaporized state before being mixed with the intake air, no carburetor or other fuel atomizing device is required. The fuel charge is burned in engine 44 to produce thermal energy which is converted in the usual manner to mechanical energy output of the engine. Since the fuel charge comprises hydrocarbon vapors mixed with relatively high proportions of diluent carrier gases, additives such as tetralkyl lead, and the like, are not required to achieve proper combustion.

The exhaust manifold of engine 44 is connected by line 46 to thermal reactor 48. This may be nothing more than an enclosure adjacent the combustion chamber through which the products of combustion must pass and wherein the heat of the exhaust, coupled with the time of containment of the gases, causes oxidation of the carbon monoxide in the exhaust gas.

In order to utilize the heat of the exhaust gases to maximum advantage in achieving thermal oxidation it is preferred that reactor 48 be placed closely adjacent to the exhaust manifold.

Figure 3:
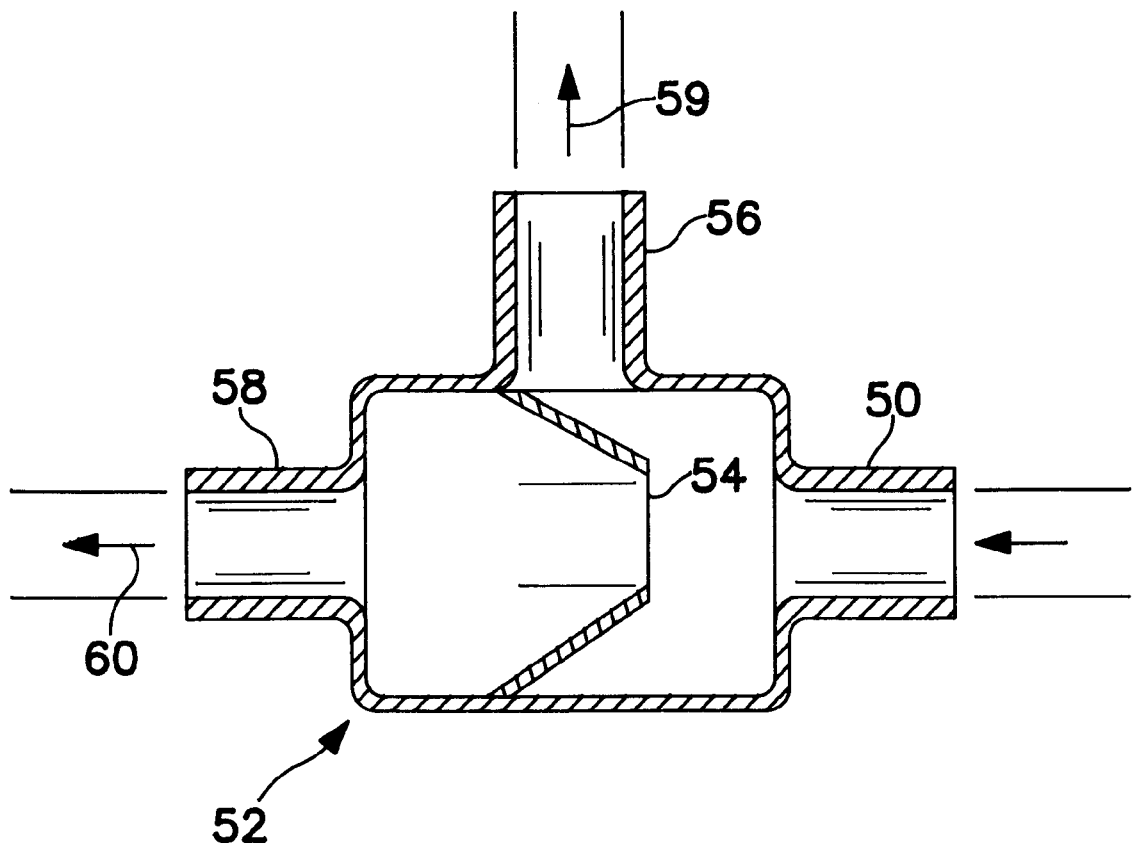
FIG. 3 is an enlarged fragmentary perspective view of a portion of FIG. 2.

From reactor 48 the exhaust gases pass through line 50 to flow limiting and diverting means 52. A suitable example of such means is shown in FIG. 3. The diameter of line 50 is enlarged somewhat a short distance before flow restricting orifice 54. Immediately above orifices 54, line 56 branches from line 50 and is of the same diameter as line 50 prior to the enlargement. The structure defining orifice 54 is within the enlarged diameter portion of the line, the diameter being again reduced on the opposite side of the orifice with line 58 corresponding in diameter to line 50.

The water vapor in the exhaust gases will tend to condense upon being expanded and cooled at flow directing means 52. Water droplets, indicated generally in FIG. 3 by reference numeral 59, may form within the portion of the line near orifice 54. Water vapor is also condensed to liquid water in heat exchanger 62, which may comprise simply a portion of the tube with fins to dissipate the heat to the surrounding atmosphere. The amount of heat removed by the heat exchanger is that required to lower the temperature of the gas below the boiling range of fuel 26. Liquid water formed in the process may be removed by an appropriate drain or valve (not shown) and/or allowed to fall into the chamber adjacent orifice 54 and flash vaporized by the heat of the gas passing through the orifice, or carried along with such gases without being again completely vaporized.

The portion of the gas passing through orifice 54 is released to the atmosphere. The volumetric proportions of the gas released and that returned to the system may be established in a desired fixed relationship by the selected diameters of orifice 54 and line 56. Alternatively, and preferably in most applications, means may be provided for selectively varying the proportions of released and recirculated exhaust gases. Such means may conveniently take the form of a variable orifice in the exhaust line, either by making the area of orifice 54 variable or providing a separate selective flow control device such as valve 61.

The recirculated portion of the exhaust gas is returned to vessel 24 through one-way check valve 63, being discharged through nozzle 64 below the surface of fuel 26. Nozzle 64 preferably has a plurality of small apertures, whereby the gases are released in the form of small bubbles, to impinge upon the rise to the surface of fuel 26. Nozzle 64 preferably has a plurality of small apertures, whereby the gases are released in the form of small bubbles, to impinge upon and rise to the surface of liquid fuel 26. The increased gas-liquid surface contact achieved by releasing the gas from small, rather than large apertures increases the efficiency of absorption of hydrocarbons by the liquid fuel from the exhaust gas. As the gas bubbles pass through the liquid fuel, vaporization concurrently occurs. As the system operates and the exhaust gases in the bubbles are acted upon by the ultrasound, the bubbles rise to the liquid fuel surface and erupt scattering their contents above the liquid surface. The released gases flow to the engine. Particulate matter, which contains carbonaceous residues, is deposited on the side wall of the vessel 24 and adheres thereto. Thus, there is a significant reduction of particulates in the exhaust emissions. The carbonaceous residue on the vessel walls can readily be removed during periodic maintenance. The unburned hydrocarbons in the exhaust gas are thereby recycled for burning in future passes through the engine. Thus, all or most of the gas released to the atmosphere has passed through the engine more than once, and perhaps, many times, thereby significantly reducing the content of unburned hydrocarbons in the released exhaust gases.

The present invention, of course may be carried out in other specific ways than those herein set forth without departing from the spirit and essential characteristics of the invention. The present embodiment is therefore to be considered in all respects as illustrative and not restrictive , and all changes coming within the meaning and equivalency range of the appended claims are intended to be embraced therein.

That which is claimed is:

1. A volatile liquid fuel combustion system for substantially reducing harmful products of combustion, said system comprising, in combination:

a. An enclosed vessel containing a quantity of volatile liquid fuel;
   b. means for extracting gaseous vapor from said fuel and mixing said vapors with combustion supporting gas;
   c. a thermal energy conversion means for oxidizing the fuel vapor-gas mixture;
   d. a thermal reactor into which products of combustion from said conversion means are discharged; said thermal reactor having an input for receiving the receiving the products of combustion and an output;
   e. flow limiting means connected to the output from said thermal reactor for discharging a first portion of said exhaust to the atmosphere and returning a second portion of said exhaust to said enclosed vessel;
   f. means for discharging said second portion at a temperature below the boiling temperature of the liquid fuel, into said vessel below the surface of the liquid fuel therein; and
   g. ultrasonic generator means for imparting ultrasonic energy to the second portion of said exhaust products of combustion.

2. The volatile liquid fuel combustion system according to claim 1 wherein said thermal energy conversion means comprises an internal combustion engine.

3. The volatile liquid fuel combustion system according to claim 2 wherein said thermal reactor comprises an enclosure for receiving the exhaust gases of said internal combustion engine and of sufficient capacity to effect substantially complete oxidation of carbon monoxide therein as the gases pass through said enclosure.

4. The volatile liquid fuel combustion system according to claim 1 wherein an exhaust line extends from said thermal reactor and said flow limiting means comprises an orifice of smaller area than said exhaust line interposed therein, and a branch line extending from said exhaust line to said discharging means to carry the said second portion of said exhaust gas which cannot pass through said orifice back to said vessel.

5. The volatile liquid fuel combustion system according to claim 4 further including heat exchanger means in said branch line for reducing the temperature of the exhaust gas passing therethrough.

6. The volatile liquid fuel combustion system according to claim 4 further including a one-way check valve in said branch line allowing flow therethrough only toward said vessel.

7. The volatile liquid fuel combustion system according to claim 4 wherein said orifice is positioned directly below the connection of said branch line with said exhaust line, whereby a portion of the water in said branch line drops over said orifice and is flash vaporized.

8. The volatile liquid fuel combustion system according to claim 1 wherein said discharge means comprises a nozzle having a plurality of small apertures and arranged on the end of a line carrying said second portion of said exhaust back to said vessel.

9. The volatile liquid fuel combustion system according to claim 1 further including a line for carrying said vapors out of said vessel and a one-way check valve interposed therein.

10. The volatile liquid fuel combustion system according to claim 1 wherein said means for imparting ultrasonic energy comprises a sound board.

11. The volatile liquid fuel combustion system according to claim 10 wherein said sound board acts to transmit ultrasonic vibrational energy generated by the thermal energy conversion means to the exhaust gases.

12. The volatile liquid fuel combustion system according to claim 1 wherein said means for imparting ultrasonic energy comprises an ultrasonic generator mounted so as to transmit ultrasonic energy to said exhaust gases.

13. The volatile liquid fuel combustion system according to claim 12 wherein said ultrasonic generator is mounted in operative association with said thermal reactor.

14. A method of operating an internal combustion engine fueled with an initially liquid, volatile fuel, comprising the steps of:

a. vaporizing a quantity of volatile liquid fuel in an enclosed vessel;

b. extracting gaseous vapors from the fuel and mixing the vapors with combustion supporting gas;

c. burning the fuel vapor-gas mixture in a combustion engine cylinder;

d. directing the exhaust gases from the combustion engine cylinder into a flow limiting valve interposed in the path of exhaust gases and dividing the exhaust gases into a first portion which is exhausted to the atmosphere and a second portion which is returned to the enclosed vessel;

e. discharging the second portion at a temperature below the boiling range of the liquid fuel, into the vessel below the surface of the liquid fuel therein; and g. imparting ultrasonic energy to the second portion of said exhaust gases.

15. The method according to claim 14 wherein the enclosed vessel comprises an enclosure for receiving exhaust gases of the combustion engine cylinder and wherein the enclosure is of sufficient capacity to effect substantially complete oxidation of the carbon monoxide therein as the gases pass through the enclosure.

16. The method according to claim 14 further including an exhaust line extending from the enclosed vessel and the flow limiting valve includes an orifice of a smaller area than the exhaust line interposed therein, and a branch line extending from the exhaust line to carry the portion of the exhaust gas which cannot pass through the orifice back to the enclosed vessel to be discharged therein.

17. The method according to claim 16 further including a heat exchanger in the branch line for reducing the temperature of the exhaust gas passing therethrough.

18. The method according to claim 16 further including a one-way check valve in the branch line allowing flow therethrough only toward the enclosed vessel.

19. The method according to claim 16 wherein the orifice is positioned directly below the connection of said branch line with the exhaust line, whereby a portion of the water vapor in the exhaust gases condenses in said branch line and drops over said orifice and is flash vaporized.

20. The method according to claim 14 further including a nozzle having a plurality of small apertures and arranged on the end of a line carrying the second portion of the exhaust back to the vessel.

21. The method according to claim 14 further including a line for carrying the vapors out of the vessel and a one-way check valve interposed therein.

22. The method according to claim 14 further including a sound board constructed and arranged so as to transmit ultrasonic energy to the exhaust gases.

23. The method according to claim 22 wherein the sound board acts to transmit ultrasonic vibrational energy generated by the combustion cylinder to the exhaust gases.

24. The method according to claim 14 further including an ultrasonic generator constructed and arranged so as to transmit ultrasonic energy to the exhaust gases.

25. The method according to claim 14 wherein the ultrasonic generator is mounted in operative association with the enclosed vessel.

\* \* \* \* \*